[19] United States Patent
Lechner
[11] 3,918,027
[45] Nov. 4, 1975

[54] SCANNING AND ERROR CHECKING APPARATUS FOR ADDRESS DEVELOPMENT UTILIZING SYMMETRIC DIFFERENCE ENCODED DATA STRUCTURE

[75] Inventor: Robert J. Lechner, Needham, Mass.
[73] Assignee: Honeywell Information Systems Inc., Waltham, Mass.

[22] Filed: June 24, 1974
[21] Appl. No.: 482,125

[52] U.S. Cl. ............... 340/146.1 F; 360/49; 360/72
[51] Int. Cl.$^2$ ..................... G11B 27/36; G06K 5/00
[58] Field of Search .............. 340/146.1 C, 146.1 D, 146.1 F, 340/172.5; 360/27, 48—49, 72, 137

[56] References Cited
UNITED STATES PATENTS
3,366,928 1/1968 Rice et al. ........................ 340/172.5
3,439,344 4/1969 Stanga ............................ 340/172.5

*Primary Examiner*—R. Stephen Dildine, Jr.
*Attorney, Agent, or Firm*—Nicholas Prasinos; Ronald T. Reiling

[57] ABSTRACT

A method and apparatus for generating symmetric difference separators that support bidirectional scanning of sequences of fields of variable length and/or type is disclosed. Symmetric difference separators of the two immediately adjacent data field types are generated by exclusive-OR addition and utilized as punctuation marks to support bidirectional scanning. Error checking apparatus and techniques are utilized to resolve boundary alignment problems when a separator is in error.

13 Claims, 12 Drawing Figures

SCANNING AND ERROR CHECKING APPARATUS FOR ADDRESS DEVELOPMENT UTILIZING SYMMETRIC DIFFERENCE ENCODED DATA STRUCTURE

RELATED APPLICATIONS

The following application is incorporated by reference to this application: Application No. 482,406 filed on 6/24/74 entitled, "Sequentially Encoded Data Structures that Support Bidirectional Scanning" by Robert J. Lechner.

BACKGROUND

1. Field of the Invention

This invention relates generally to encoded data structure techniques and computer hardware, and more particularly to a coding method and computer hardware that supports bidirectional scanning of fields, which is economical in space, time and money.

2. Description of the Prior Art

In serial storage of data in a computer system a basic problem is that of identifying the type and/or length of unpredictable sequences of character-string data or fields. A fundamental requirement in connection with this problem is that the data sequence must be scannable in either direction.

There are two generally known prior art methods of encoding such sequences. One way is to reserve one or more "field separator" characters, which are not legal characters. (See E. H. Beitz, The Interpretation of Structured Stored Data Using Delimeters, Proc. 1970 ACM SIGFIDET Workship on Data Description & Access, November, 1970, pp. 188–200). A cyclic FIFO buffer is utilized, in which a single pointer defines the current data entry point. Field names and/or lengths are stored adjacent to their value strings. FIG. 1 depicts such a prior art scheme wherein the field names and/or lengths $A_1$, $B_1$, $C_1$ and $D_1$ are stored adjacent to their respective value strings, Value $(A)_1$, $(B)_1$, $(C)_1$ and $(D)_1$. The letters $L(A)_1$, $L(B)_1$, $L(C)_1$ etc., refers to the lengths of the value fields respectively. To scan the buffer from left to right, the next field's starting address is computed by adding the preceding field's length and starting address. Unfortunately, however, with this technique right-to-left scan is not possible, because the value field is encountered first, and its vice cannot be located without knowing its length, and vice versa.

Another prior art approach shown on FIG. 2 avoids this last restriction and permits random access to fields by segregating field names $A_2$, $B_2$, $C_2$ and $D_2$ from their value text Value$(A)_2$, Value$(B)_2$, Value$(C)_2$ etc. The field names are assumed to be fixed length and are kept in a separate ordered list, which can be indexed or scanned from either end. Before writing a tape block, the sequence of field names is appended to the value string sequence. FIG. 2 shows this solution, with field names $A_2$, $B_2$, $C_2$ and $D_2$ stored in reverse order from their value text Value $(A)_2$, $(B)_2$, $(C)_2$ etc., starting at the end of the data block. Names and values are accumulated simultaneously and both share a common pool of unused byte-cells in the middle of of the data block. However, this technique has the disadvantage of complicating physical concatenation of data and/or logical chaining.

One unique solution to the problem not believed to be in the prior art and still able to overcome one-directional scanning limitations is shown in FIG. 3A, wherein field names $A_3$, $B_3$, $C_3$, $D_3$ are embedded before and after each corresponding value string Value $(A)_3$, $(B)_3$, $(C)_3$, $(D)_3$ respectively. An obvious disadvantage with this technique, however, is that it doubles the space required to store the field names. What is needed is a technique which while overcoming one-directional scanning limitations, is at the same time economical in its use of space as well as of time and money.

OBJECTS OF THE INVENTION

A primary object of the invention therefore is to provide improved coding apparatus and a method for bidirectional scanning of sequence of fields of variable length and/or type.

Another object of the invention is to provide a method and apparatus for generating symmetric difference separators of any two immediately adjacent data fields to support bidirectional scanning.

Still another object of the invention is to provide parity checking techniques and hardware to resolve boundary alignment problems when a symmetric different separator is in error.

These and other objects of the invention will become apparent from the description of a preferred embodiment of the invention when read in conjunction with the drawings contained herewith.

SUMMARY OF THE INVENTION

Bidirectional scanning for sequences of fields of variable length and/or type is supported by a symmetric difference (or Boolean difference) $\Delta$ AB which is the carry-free exclusive OR (bit-wise modulo-two) sum of the binary codes representing the type or length for any two adjacent fields A and B (i.e. $\Delta AB = A \oplus B$. The symmetric difference of any two adjacent fields is generated by computer hardware, and is used as a punctuation mark or separator between said adjacent fields. Once symmetric differences have been generated for sequences of adjacent fields as shown in FIG. 3B scanning of these sequences of fields may proceed in either direction right or left.

For example, assume that a left to right scan of FIG. 3B has just begun. Given the identity of the first field $(A)_1$ it is desired to identify the (unknown) second field as type B. The field length of Value (A) field is obtained from a table of field lengths or directly from separator A. The $\Delta$ AB field is then located and the difference $\Delta$ AB is exclusive-OR added to the known field name A to give B. Similarly, $\Delta$ BC is located relative to $\Delta$ AB via the length of field Value (B) which was previously calculated as B, and exclusive-OR added to obtain C (i.e. $C = B \oplus \Delta BC$). Since $B = C \oplus \Delta BC$ and $A = B \oplus \Delta AB$, etc., this procedure works equally well when beginning at the right side and scanning left, when the identity of the right-most field is extracted upon block entry from the right-most separator appended to this field.

When a symmetric difference separator is in error, the error is located by doing a forward scan and a backward scan and generating absolute addresses during each scan for each symmetric difference separator. A comparison of the two sets of absolute addresses generated will indicate the exact place where the error occurred when the addresses compared are the same.

BRIEF DESCRIPTION OF THE DRAWINGS

The novel features which are characteristic of the invention are set forth with particularity in the appended claims. The invention itself, however, both as to organization and operation together with further objects and advantages thereof may beset be understood by reference to the following description taken in conjunction with the drawings in which:

GENERAL DISCUSSION

1. Representation of Variable Data Field Sequences

Sequential data entry and recording on serial media, such as tape cassettes, is conveniently accomplished by using a double-ended FIFO buffer or "deque" with top and bottom end markers, keyboard input (load) and tape output (write) pointers (D. R. Knuth: The Art of Computer Programming Vol. I, Fundamental Algorithms, Addison-Wesley, Reading, Mass., 1968). Logically, the buffer is cyclic, with not attention paid to the physical top and bottom end addresses. Logically, these ends are joined together by computing addresses modulo the buffer size; that is, when "1" is added to the bottom end address, the result is the top or start address. In the most general case, tape block reading or writing (physical I/0) from one sector of the buffer can go on concurrently with data field insertion of extraction from another buffer sector (logical I/0).

The problem considered in this disclosure is that of storing a sequence of data fields of varying type. Two application requirements occur together, wherein the FIFO buffer organization described above runs into difficulty:

1 Optional or Varying Occurrences: Some field types may have optional or varying numbers of occurrences as attributes; in either case, the next field type is sometimes unpredictable, so that field type identifiers (names) must be recorded along with the data.

2 Bidirectional Scanning: When backward as well as forward scanning of the data file is required, field by field, the queue becomes double-ended on the tape or physical I/0 side.

Requirement (1) is motivated by a desire for flexible source data formating or seven free-form (self-describing) data entry. Requirement (2) is implied by functions such as editing or on-line correction which make use of a "backspace one field" operator or function key, or a bidirectional scrolling facility using a CRT display.

Figure 1:
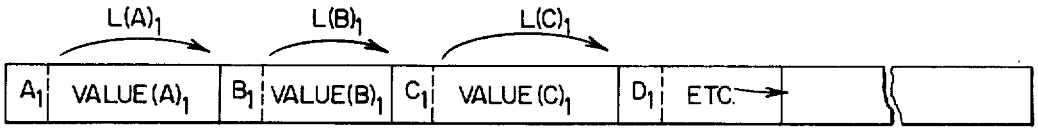
Fig. 1. PRIOR ART
FIGS. 1 and 2 are prior art solutions to the problem.
Figure 3:
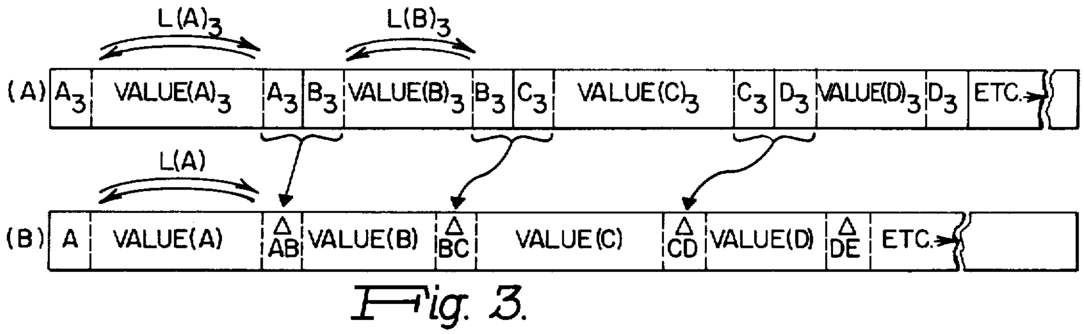
FIG. 3A is another solution to the problem not found in the prior art, but helpful in explaining the invention.
FIG. 3B is one embodiment of the sequentially encoded data structure of the invention that supports bidirectional scanning.

Recommended Solution – One way to overcome the onedirectional scanning limitation of the format in FIG. 1 is to embed a field name before and after its value string (see FIG. 3A and background discussion). However, this doubles the space needed to store field names. The recommended approach is a simple extension of this format which avoids duplicate storage of field names. (See FIG. 3B).

FIG. 3A shows each field value with a name (one-byte symbol A, B, etc.), at both ends. In FIG. 3B except for the initial and final field name, the two symbols separating each pair of field values have been combined into one symbol, the "symmetric difference" between the two field names it replaces. The initial and final field names may be regarded as symmetric differences that result from combining with the "all zeros" name.

The symmetric difference (or Boolean difference) AB is defined as the carry-free exclusive-OR (bit-wise-modulo-two) sum of the binary codes for A and B: AB = A + B. When A and B are k-bit symbols, the signed algebraic difference AB = (B–A) or the ring sum A+B (mod $2^k$) would work equally well, but the symmetric difference is simpler and faster on machines with an exclusive-OR instruction. The other two operations must be replaced by subtraction when the direction of scan is reversed, but the exclusive-OR operation is independent of the direction of scan.

There are two alternate interpretations for the codes A and B on which the symmetric difference is based. In FIG. 3B, an indirect or variable-field-type interpretation, A and B are the actual values of field type codes, and the A and B value field lengths are assumed stored in a separate table indexed by the field type code. In the second or alternate interpretation, A and B are the actual value field lengths. The second or alternate interpretation in which the type codes are identified directly with field length, will be discussed later.

For example, suppose we have just begun a left to right scan in FIG. 3B. Given the identity of the first field (A) we wish to identify the (unknown) second field as type B. We add the difference $\Delta$ AB to the first field name A, after locating $\Delta$ AB by looking up field A's length in a table. We locate $\Delta$ BC relative to $\Delta$ AB via the length of B, and then compute C = B$\oplus\Delta$ BC to identify the third field. Since B = C $\oplus\Delta$ BC and A = B $\oplus\Delta$ AB, etc., this procedure works equally well when beginning at the right side and scanning left, if the identity of the right-most field is known upon block entry.

2. Other Applications

The above solution assumed a relatively small number (at most 225) field types, each of known constant length, repeated often enough to justify a stored table of field lengths. Other applications will now be considered.

Text Editing — For interactive test editing, a bidirectional scan has obvious advantages. A minor change to the semantics of the scanning algorithm permits its application to a contiguous sequence of words or other "atomic" elements of text.

One important consideration is that now the fields are not merely repetitious instances of a few ( $\leq$ 255) fixed-length field types. In fact, all of the fields might just as well be considered as members of a single, variable-length field class. Now we have at least 225 field identifiers to use for other purposes (zero is reserved for the null field identifier). Therefore define all words of length $k$, $1 \leq k \leq 255$, as members of the k-th field class, and assign the binary value of k as identifier for this class. (The reserved null field type is consistent with this convention). Symmetric difference separators are now computed as before, with one additional advantage: the table which formerly defined field length (when indexed by field type) now becomes the identity map and is not longer needed.

Introducing symmetric difference codes as field separators need not involve any expansion of text volume. For example, suppose an "atomic" element of text is defined to be any contiguous string of non-space characters between two space characters. Without loss of generality, every pair of contiguous space characters may be regarded as bracketing a null or zero length atomic element. Then, every sequence of space characters may be replaced by an equal-length sequence of field separators, coded as symmetric differences.

For example, let the values of two fields A and B be "the" and "word", respectively. Adopt the convention that an underlined digit represents the 8-bit binary code for itself; e.g., $\underline{7}$ denotes the bitstring "00000111". Then the type codes for fields A and B are identified with their lengths and becomes $\underline{3}$ and $\underline{4}$ respectively. The symmetric difference $\Delta$ AB = $\underline{3} \oplus \underline{4}$ = $\underline{7}$. The text strings below are mapped into symmetric-difference-coded equivalents without changing their lengths in bytes ("#" represents one space):

| | | |
|---|---|---|
| (a) | "the # word" | "the $\underline{7}$word" |
| (b) | "the # # word" | "the$\underline{3}\underline{4}$word" |
| (c) | "the # # ... # # word" | "the$\underline{3}\underline{0}$...$\underline{0}\underline{4}$word" |

In ($a$), $\Delta$ AB replaces one space characters; in ($b$), $\underline{\Delta\ AO}$ $\underline{\Delta\ OB}$ replaces two spaces; in (c), $\underline{\Delta\ AO}$ $\underline{\Delta\ OO}$ . . . $\underline{\Delta\ OO}$ $\underline{\Delta\ OB}$ replaces a corresponding number of spaces.

One disadvantage of this length-preserving text-encoding method is that it does not separate punctuation marks from alphanumeric strings within atomic elements of text. However, a punctuation symbol which is immediately preceded and/or followed by an alphanumeric string may be encoded as a separate one-byte field by artificially inserting a separator before and/or after the punctuation symbol. This expands the text by one or two extra bytes per punctuation symbol. Upon decoding, these separators are replaced by null fields rather than space characters. (Later with respect to tree structures the convention will be adopted that a null field exists between any two adjacent separators).

Dictionary Look-up — All of the above text editing considerations apply equally well to dictionary (e.g., symbol table) look-up. To expedite searches, a very long string of lexicographically ordered words is partitioned into blocks, for which an index table is also prepared. Index table entries point to block end points which contain field lengths, rather than symmetric differences, as in FIG. 3B. This permits bidirectional scanning from multiple entry points.

Variable-Length Fields with a Fixed Sequence of Types — Both applications above may be regarded as the special case (n=1) of a data stream with multiple field types in which the type sequence is predictable but field lengths are variable and must be encoded into symmetric differences. For example, cardformatted data with exactly one instance of each field type could use summetric difference coding to suppress leading zero and/or trailing blanks.

Fields or Unpredictable Type and Length — When neither field type nor length can be inferred from the other then symmetric difference coding of both length and type is possible. In general, this will involve more than 8 bits per separator; for example, a two-byte separator may be utilized.

3. Error Protection

All encoding methods which build up a field address by incremental addition of preceding field lengths are vulnerable to the error extension problem, or multiple errors caused by a single erroneous field length indication. In general, this will force all succeeding field boundaries out of alignment and manual interpretation may be necessary to recover their data. Accordingly, a single-error-detection method using a one-way scan is utilized whereas for correction a two-way scan is utilized.

Figure 2:
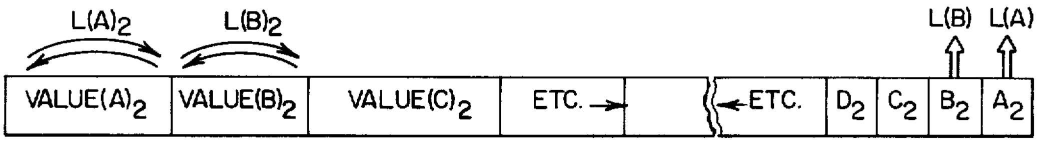
Fig. 2. PRIOR ART

Error extension can be avoided completely by recording a separate table of relative addresses or offsets to individual fields, as in FIG. 2, but with other disadvantages discussed earlier. Another way is to take advantage of the unique parity checking feature of symmetric difference coding. This provides error detection and correction advantages equivalent to the use of two redundant pointer chains as shown below.

Padding — One requirement for effective error control is the ability to partition a sequence of variable-length fields into blocks of fixed length. In general, field boundaries will not coincide with block boundaries. To avoid splitting a field into two parts (which introduces a new coding problem) and to permit resynchronization of the field address pointer at inter-block boundaries, a block is padded preferably by some method which does not complicate the logic of the scanning algorithm. Padding is accomplished by reserving a particular 8-bit symbol (or 8-tuple) to indicate a "null" field type, defined as one whose value string has zero length. To be consistent with those applications which replace a field's type code by its value string length in bytes, the zero 8-tuple is reserved as a null field type code.

Null field values take up no space, but their separators do. The scanning algorithm still works, and a small amount of logic to recognize and skip over null field separators will make them transparent to the scan algorithm.

Two non-null fields (say, field types A and B) with value strings denoted $V_A$, $V_B$ and separator denoted $\underline{\Delta AB}$ appear as follows in FIG. 3B:

$V_A$ $\underline{\Delta AB}$ $V_B$

To insert a null field (type $\phi$) between A and B, we merely replace $\underline{\Delta AB}$ by the two separators $\underline{\Delta A\phi}$, $\underline{\Delta\phi B}$; (this inserts one extra byte into the field stream). Two null fields between A and B appear as $V_A$ $\underline{\Delta A\phi}$ $\underline{\Delta\phi\phi}$ $\underline{\Delta\phi B}$ $V_B$. (Each underlined triple represents a one-byte field separator). Each additional null field introduces another $\underline{\Delta\phi\phi}$ separator, whose value is $\phi \oplus \phi = \phi$.

Self-identification — In order to begin a field scan at either block boundary it is necessary to known the identity of the first field to be scanned. For this purpose it is sufficient to adopt the convention that at least one null field will always be inserted at every block boundary.

Suppose a block boundary occurs between fields A and B of the preceding example. Within the field stream $V_A$ $\underline{\Delta AB}$ $V_B$, the separator $\underline{\Delta AB}$ must be assigned either to the block containing $V_A$ or to the one containing $V_B$. Neither choice is satisfactory. For example, if $\underline{\Delta AB}$ is stored with $V_B$, then a backward scan into the block containing $V_A$ requires prior reference to succeeding blocks before field type A (and its length) can be identified.

This problem disappears if two null field separators straddle the block boundary. For example, with a boundary between $\underline{\Delta A\phi}$ and $\underline{\Delta\phi B}$ in the field sequence $V_A$ $\underline{\Delta A\phi}$ $\underline{\Delta\phi B}$ $V_B$, the scanning algorithm will encounter a separator ($\underline{\Delta A\phi}$ or $\underline{\Delta\phi B}$) no matter which direction it begins to scan. Because zero represents the null field type, $\underline{\Delta A\phi} = A \oplus \phi = A$ $\underline{\Delta\phi B} = B \oplus \phi = B$. In other words, null fields have the nice property that adjacent separators directly identify the adjacent field type. In other words, the two fields at the edges of any block are self-identifying, if blocks are padded to avoid splitting fields and at least one null field is inserted at block boundaries.

Resynchronization — Null field insertion at block boundaries makes each block independent of adjacent blocks, as far as the field scan process is concerned. However, a correct field scan from one end of a block to the other still requires all intervening field separators to have correct values. What if an error occurs?

Consider first the error detection problem. If null fields are "inserted" at both block boundaries, a correct sequence of field separators will automatically have a zero-valued longitudinal parity check sum. For example, suppose a block contains four fields; A, B, B, C; the sequence of field separators and interspersed value strings will be $\underline{\Delta\phi A}$ $V_A$ $\underline{\Delta AB}$ $V_B$ $\underline{\Delta BB}$ $V_B$ $\underline{\Delta BC}$ $V_C$ $\underline{\Delta C\phi}$ By definition, $\Delta\phi A = A$, $\Delta AB = A \oplus B$, etc., the parity check sum of these five separators is $$\underline{\Delta\phi A} \oplus \underline{\Delta AB} \oplus \underline{\Delta BB} \oplus \underline{\Delta BC} \oplus \underline{\Delta C\phi} = A \oplus (A \oplus B) \oplus (B \oplus B) \oplus (B \oplus C) \oplus C = (A \oplus A) \oplus (B \oplus B) \oplus (B \oplus B) \oplus (C \oplus C) = \phi$$

by the associative property of exclusive-OR addition. That is, field type or length codes appear in pairs, causing pairwise cancellation in the overall checksum. In conclusion, this zero checksum property permits rapid detection of separator errors. It also discriminates between separator and value string errors if an overall error detection coding scheme is also used. Often, block lengths can be restricted to make the probability of more than one separator error per block negligible.

Assuming a single separator is in error, how can its location be established without ambiguity? A nonzero check sum over the correct locatiaon of an erroneous field separator sequence would yield the error pattern but not its location. However, this actual checksum is not computable because the computed sequence of separator addresses may diverge from the correct locations beyond the point of error. The solution is to begin checking from the opposite end as well.

It is easily verified that whenever the two sequences of separator addresses (starting from opposite ends of the block) have only one address in common, then their point of contact is the erroneous separator location. In this case, the correct separator value is the symmetric difference of the field type codes computed by the two scans just prior to their point of contact, since this gives an overall check sum of zero.

Furthermore, if the two address sequences have multiple contact points, then each contact point must be considered as a possible error location. This provides double error detection, although not all double byte errors are necessarily detected in this way. For example, if field type A and B have the same length, a double separator byte error pattern that interchanges $\underline{\Delta AB}$ with $\underline{\Delta AA} = \underline{\Delta BB} = \phi$ would recognize the field sequence $V_A$ $\underline{\Delta AB}$ $V_B$ $\underline{\Delta BB}$ $V_B$ as $V_A$ $\underline{\Delta AA}$ $V_A$ $\underline{\Delta AB}$ $V_B$.

Such double errors are not detectable by the symmetric difference coding (note that they do not imply loss of correct pointer alignment).

4. Representation of Tree-Structured Data

The symmetric difference approach will now be extended to irredundant packed sequential representation of hierarchial or tree-like data structures. This permits bidirectional scanning at any level of the tree, without the necessity of scanning intervening data.

Figure 4:
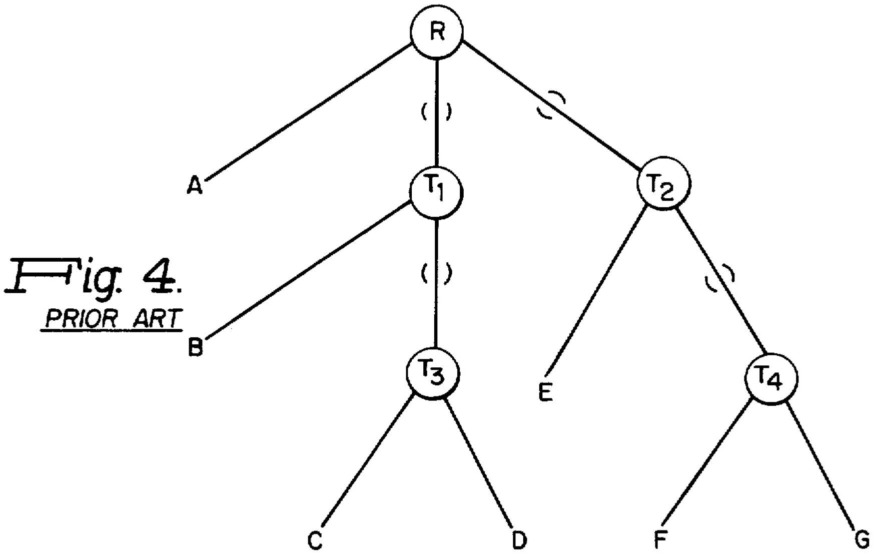
Fig. 4. PRIOR ART
FIG. 4 is a prior art tree data structure utilized in the invention.

As an example, consider the tree structure of FIG. 4 in which A, B, etc., represent field types whose values $V_A$, $V_B$, etc., are to be stored sequentially in the order (ABCDEFG). Nonterminal nodes R (for root) and $T_k$ may have data fields (leaves of the tree) or other nodes (subtrees) attached to them. Branches leading to each subtree are surrounded by matched pair of parenthesis. The corresponding parenthesized linear representation of the tree may be reconstructed from FIG. 4 by reading off all branch and leaf labels while traversing the tree counter-clockwise: A (B(CD)) (E(FG)). (For definitions and discussion of Tree Structures see pps. 305–379 of Vol. 1. of The Art of Computer Programming by Donald E. Knuth, published by Addison-Wesley Publishing Company).

The value string corresponding to this representation is $V_A(V_B(V_CV_D))$ $(V_E(V_FV_G))$. This string is unambiguous as long as "("and")" are reserved characters that do not appear in $V_A$ through $V_G$ or if $V_A$ through $V_G$ are of known fixed or computable lengths. To avoid reserving the parenthesis characters, suppose they are considered as one-byte values of a special "punctuation" field type, p. In our example, $V_p$ is either ")" or "(" and must be embedded within field separators just like any other field. Applying symmetric difference coding to this field sequence gives this result, requiring two bytes per parenthesis character:

$\underline{\Delta\phi A}$ $V_A$ $\underline{\Delta Ap}$ $V_p$ $\underline{\Delta pB}$ $V_B$ $\underline{\Delta Bp}$ $V_p$ $\underline{\Delta pC}$ $V_C$ $\underline{\Delta CD}$ $V_D$ $\underline{\Delta Dp}$ $V_p$ $\underline{\Delta pp}$ $V_p$ $\underline{\Delta pp}$ $V_p$ $\underline{\Delta pE}$ $V_E$ $\underline{\Delta Ep}$ $V_p$ $\underline{\Delta pF}$ $V_F$ $\underline{\Delta FG}$ $V_G$ $\underline{\Delta Gp}$ $V_p$ $\underline{\Delta pp}$ $V_j$ $\underline{\Delta pp}$ The two distinct meta-bracket values "(" and ")" may be replaced by two distinct reserved field types, in which case their values may be null. For example, using ↓ and ↑ to denote type codes for meta-brackets of type "(" and ")" respectively, and ΔAB to represent the symmetric difference of type codes A and B, the tree of FIG. 4 is representable as $\underline{\Delta\phi A}$ $V_A$ $\underline{\Delta A\downarrow}$ $\underline{\Delta\downarrow B}$ $V_B$ $\underline{\Delta BC}$ $V_C$ $\underline{\Delta CD}$ $V_D$ $\underline{\Delta D\uparrow}$ $\underline{\Delta\uparrow\uparrow}$ $\underline{\Delta\uparrow\downarrow}$ $\underline{\Delta\downarrow E}$ $V_E$ $\underline{\Delta E\downarrow}$ $\underline{\Delta\downarrow F}$ $V_F$ $\underline{\Delta FG}$ $V_G$ $\underline{\Delta G\uparrow}$ $\underline{\Delta\uparrow\uparrow}$ $\underline{\Delta\uparrow\phi}$ This structure is efficient in storage because only one additional byte is needed for each embedded open or close parenthesis symbol. However, every field must still be scanned to traverse the tree, and this is not efficient for many applications. For example, suppose A represents an "if" condition, B(CD) represents a "then" clause and E(FG) an "else" clause of a parsed source language statement to be interpreted. After runtime evaluation of condition A the interpreter would like to scan B(CD) but skip E(FG), or skip B(CD) and then scan E(FG).

What is missing from the preceding tree representation? All of them are inefficient in the sense that a scan in either direction must still traverse every node and every leaf of the tree to get from the one end to the other.

If the tree has many nested levels, and if we are only interested in selecting one higher-level node, then much time will be wasted in such a scan. What is needed is a "subtree separator" which conveys information about the lengths of the complete substructures attached to its adjacent nodes. The rest of this section describes a tree structure representation which does permit skipping over subtrees, by reserving a single field type called an "internode separator" and using symmetric difference techniques to encode its contents.

Extension for Rapid Scanning — The preceding encoded representation of a tree structure is not efficient when a known path through the tree must be located. For example, on FIG. 4, suppose field F is known in advance to be attached to the first leaf of the second branch of the third branch attached to the root node. The extension proposed below will permit the scanner to skip the first two branches attached to the root node, then descend one level (to node $T_2$ on FIG. 4) and skip field E, arriving at field F in three jumps rather than the five jumps required to scan over A, B, C, D and E.

A new reserved field type code (denoted p) called an internode separator field, is needed. Its non-null value depends only on the lengths of the subtrees which it borders or separates, and is used to jump over a subtree in either direction. Symmetric difference coding is used on internode separator field values, to minimize storage requirements. Fields of type p are embedded in the field stream just like data and null field types. While a field-sequential scan merely recognizes and skips over internode separators (as with padding fields), a tree scanning algorithm must contain logic to recognize them and use them appropriately.

A typical length of two bytes is assumed for internode separators although other lengths may be utilized; this limits the maximum subtree length to 65K bytes; (if this is inadequate, a 24 bit value could be used). A stack is used with this method of scanning to save place markers (address pointers or offsets) for the beginning and end of the subtree being scanned (or one end and its length). The stack also permits a direct return from within any subtree to its root or parent node without going through other branches of this subtree.

It is simple to construct the proposed encoded form of a tree by a sequential scan of its parenthesized field structure. Each closing parenthesis, and each opening parenthesis that does not have a closing parenthesis as its immediate predecessor, is replaced by an internode separator field with a 2-byte value. A pair of parenthesis of the form ") (" is combined into one internode separator field.

Within each internode separator field corresponding to a single open or close parenthesis will be placed the distance (in bytes) to the opposite matching parentheses. (This is analogous to the self-identifying field separators at block boundaries in section 3). Within the internode separator corresponding to a pair of "Close, open" or "), (" parentheses is placed the symmetric difference of the distances to their matching parentheses. (This construction is consistent with the previous encoding of field-lengths into field separators).

Each pair of matching parentheses plus all of its enclosed fields and nested parenthetical pairs corresponds to one subtree and the branch connecting it to its parent node. For example, the tree of FIG. 4 contains 7 leaves and 4 subtrees. Its root node is labeled R and the root nodes of its subtrees are labeled $T_1$, $T_2$, $T_3$ and $T_4$.

The encoded representation of a subtree will be called a compound element, and represents a new byte-string-valued data type. That is, a compound element is any sequence of fields including internode separator fields, in which the latter obey certain constraints on their pairwise occurrences and contain appropriate length-defining values.

Compound elements may be nested. Note that the internode separators corresponding to open and close type parentheses are only distinguishable by tracking their positions relative to parent nodes; a separator position and value determines the location of its matching separator; the intervening internode separators specify inner structure at lower levels of the tree.

In FIG. 4, four compound elements are identified by parentheses around the branches leading to the root nodes of their corresponding subtrees. Only one pair of subtrees ($T_1$ and $T_2$) are adjacent to each other at the same tree level. The other two subtrees ($T_3$ and $T_4$) are isolated by fields or higher level brackets. Let $V_A$ denote a value string for a field of type A. Let $L_j$ denote the value of a p-type field (instead of $V_p$). Define $L_j$ = length in bytes of (the encoded representation of) subtree $T_j$ in FIG. 4, and define $L_{ij} = L_i \oplus L_j$, the symmetric difference of $L_i$ and $L_j$. Then the tree structure of FIG. 4 requires the following sequence of field types to be encoded:

ApBpCDppEpFGpp

Substituting $V_A$ for A etc., and $L_j$ or $L_{ij}$ for p we obtain the field value sequence $V_A\ L_1\ V_B\ L_3\ V_C\ V_D\ L_3\ L_{12}\ V_E\ L_4\ V_F\ V_G\ L_4\ L_2$ Appropriate field separators are inserted to punctuate this sequence of field values. let $\underline{\Delta AB}$ represent the singlebyte field separator between two value strings of fields of type A and B. Using this notation, the fully encoded linear representation for the tree of FIG. 4 is shown in FIG. 5.

Figure 5:
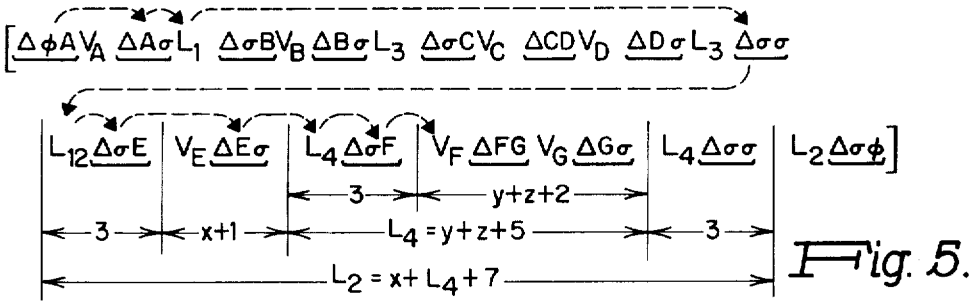
FIG. 5 is another embodiment of sequentially encoded data structures of the invention utilizing the tree data structure of FIG. 4.

FIG. 5 also illustrates the rules for computing compound element lengths. For each field which is a direct descendent of the compound element whose length is being computed, add the field's value string length plus one (separator) byte. For each nested compound element which is a direct descendent add its length plus three bytes (for a p-type field and its separator). Finally, add three bytes for the p-type field prefix to the compound element itself. This is illustrated on FIG. 5 for the subtree $T_2 = (E(FG))$; the lengths of $V_E$, $V_F$ and $V_G$ are denoted by $x$, $y$ and $z$ respectively.

To illustrate the scanning process, the example of FIGS. 4 and 5 will be used. Suppose we wish to access the field F which is known a priori to be on the first branch of subtree $T_4$. $T_4$ is on the second branch of subtree $T_2$, which is on the third branch at the top level of the tree.

The search for field F proceeds, for example, from the left edge of the encoded representation (FIG. 5) and follows the dotted lines:

1. Read $\underline{\Delta \phi A}$, lookup the length of $V_A$ and skip to $\underline{\Delta Ap}$.
2. Read $\underline{\Delta Ap}$, advance and read $L_1$, and skip to $\underline{\Delta pp}$ which is followed directly by $L_{12}$.
3. Read $L_{12}$, compute $L_2 = L_1 \oplus L_{12}$, then stack the addresses of both $L_{12}$ and $L_2$. This will allow us to return from subtree $T_4$ to either the left or the right edge of the subtree $T_2$.

4. Advance to $\underline{\Delta pE}$, lookup the length of $V_E$, and skip to ΔEp. Advance and read $L_4$ and stack its address and the address of $L_4$ (at the right edge of subtree $T_4$) which is Address ($L_4$) ⊕ Value ($L_4$).
5. Advance to $\underline{\Delta\ pF}$, which identifies F as the next field. This technique skips over three subtrees and descends two levels down into the tree structure. By unstacking the return address a return can be made immediately up any branch to the next higher level of the tree. The stacked address of the current subtree's left or right boundary is used to resume the scan in the forward or reverse direction, as desired. Internode separators within a subtree are located interior to these boundaries.

During the course of the scan, ambiguities may arise. The internode separator content does not specify whether it is an end of the current subtree, or an internode separator within it. This ambiguity is resolved by comparing the separator location to the end of the current subtree, which is one of the two subtree boundary locations on the top of the stack. Another way to resolve this ambiguity is to assign three distinct type codes $p_1$, $p_2$ and $p_3$ (first, last and intermediate) internode separator field types, corresponding to parenthesis symbols "(", ")", and ") (" respectively.

PREFERRED EMBODIMENTS

A First Preferred Embodiment

Figure 6A:
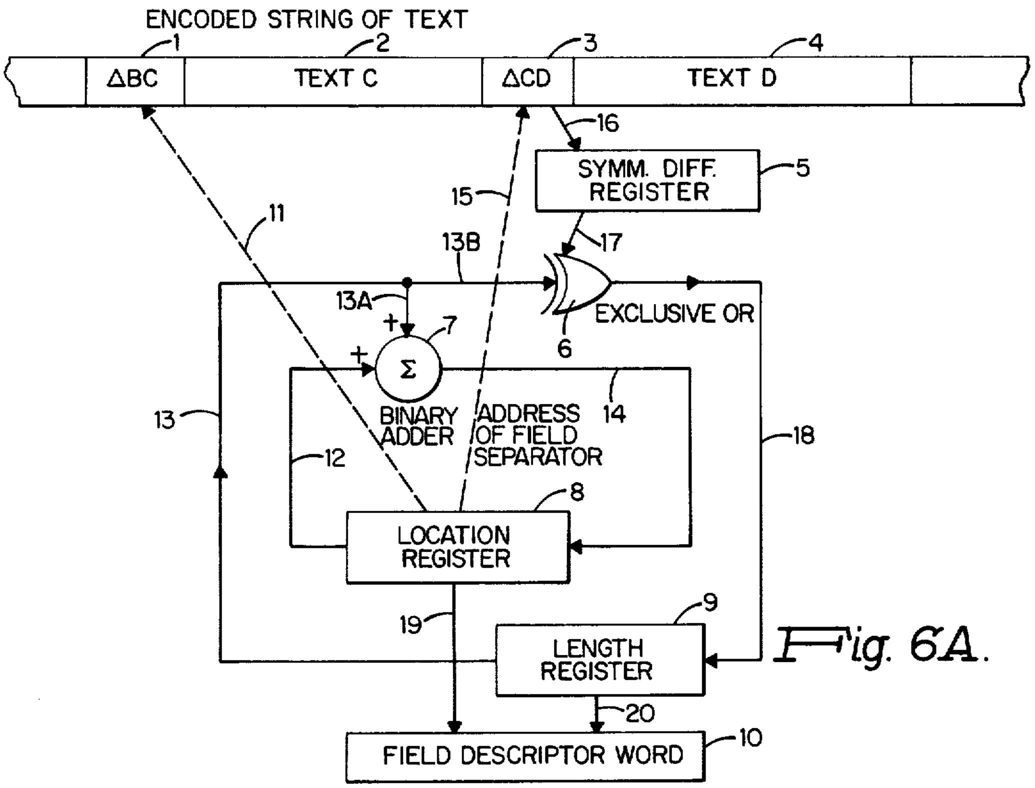
FIGS. 6A and 6B are logic block diagrams of the invention showing forward and backward scans respectively.
Figure 6B:
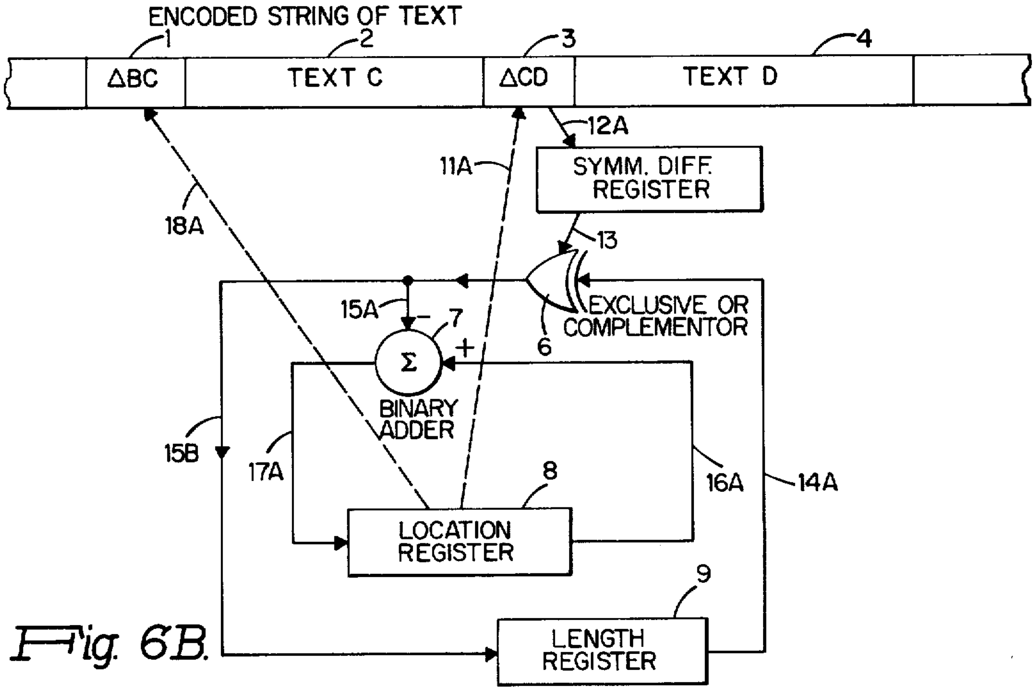

Referring to FIG. 6A and FIG. 6B, there is shown one embodiment of the invention in terms of hardware logic and registers for scanning an encoded string of text in the forward and backward directions. FIG. 6A shows the operation of the hardware when scanning in the forward direction during one cycle of operation of the hardware wherein one step of left-to-right scan from one piece of text to another piece of text of the encoded input string is accomplished. FIG. 6B shows the same string of text being scanned in the backward direction. It will be noted that the same numbers are used for the same elements of invention; however, it will be noted that the paths of the data are numbered differently. Also it should be noted that the paths of data are numbered consecutively in each diagram as they occur and will be more fully explained below. Referring first to FIG. 6A, there is shown a portion of an encoded string of text which contains two pieces of text called text C and text D denoted by numerals 2 and 4, respectively. Preceding text C is a symmetric difference separator ΔBC,1; between text C and text D is another symmetric difference separator ΔCD,3. The portion of a string of text 1, 2, 3 and 4 may be contained on a magnetic tape or sequentially addressable storage media. It is of course understood that many encoded string of text reside in the storage medium selected. In this particular case, the logically defined string of text is in the virtual memory address space of a computer memory. The contents of location register 8 represents an offset or a number of characters between some reference mark on the storage medium and a particular separator such as ΔBC,1 or ΔCD,3. In a left to right scan when the location register 8 is updated so as to indicate a new location; for example, the relative offset address from such reference mark of separator ΔCD,3, is defined by adding to the length of text C,2 the relative offset address of separator ΔBC,1. Thus, the relative offset address of separator ΔCD,3 is defined on the storage medium relative to the reference mark previously selected. Generally, the reference mark selected is the beginning of the logically defined string of text in the virtual memory address-space of the computer memory. It can be seen that the exact same procedure may be utilized on a magnetic tape or other sequential storage medium.

Referring again to FIG. 6A, the hardware itself is comprised of three registers — a location register 8, a length register 9 and a symmetric difference register 5. In addition, binary adder 7 is provided to perform an ordinary binary addition or a binary subtraction. An exclusive-OR adder or complementor 6 is provided to perform carry-free exclusive-OR addition. (It will be noted that exclusive-OR addition is equivalent to complementing the output of a register such as length register 9 at those bit positions where exclusive-OR addition of a logical "1" is indicated by the second input. The contents of location register 8 and length register 9 together comprise a field descriptor word 10. The first portion of this word is the location of the beginning of a particular field of text being scanned which is contained in location register 8. The second part of the field descriptor word is the length of said particular piece of text being scanned which is contained in the length register 9. In FIG. 6A, an assumption has been made that preceding steps of a left-to-right or right-to-left scan have initialized location register 8 and length register 9 to contain the description of text C. In the next step of a typical scan of the invention, it is desired to scan the contents of the location register 8 and length register 9 and also the symmetric difference register 5 and perform the necessary operations in order to update location register 8 so that it contains the address of the new location ΔCD,3 and also to update length register 9 so it contains the length of the next string of text D,4. Before updating, it has been shown that location register 8 contains the location of symmetric difference separator ΔBC,1 (illustrated by a dashed arrow 11), and length register 9 contains the length of text C,2. Accordingly, in updating the registers, the contents of location register 8 are first transferred along path 12 to binary adder 7; at the same time, the contents of length register 9 are transferred along paths 13 and 13A to binary adder 7 and added to the contents of location register 8. When the binary addition is complete, the result of the addition is transferred along path 14 back to location register 8. The location register 8 now contains the location of symmetric difference separator ΔCD, 3 preceding text D, as shown by dashed arrow 15. Simultaneously with the transfer of the contents of length register 9 into the binary adder 7, its contents are also transferred via the transfer path 13 and 13B into the exclusive-OR complementor 6. The symmetric difference separator ΔCD, 3 as located by the updated contents of location register 8 (shown by dashed arrow 15) are loaded via path 16 into symmetric difference register 5 which are then loaded via path 17 into exclusive-OR complementor 6, where exclusive-OR addition (modulo 2 addition) is performed and the result of the exclusive-OR addition is transferred via path 18 back to length register 9. At this point in time, one cycle of the forward scan has been completed and location register 8 contains the location of symmetric difference separator ΔCD,3; length register 9 contains the length of text D, 4 of the encoded string; and the symmetric difference register 5 contains the encoded symmetric difference ΔCD, 3.

Referring now to FIG. 6B, one complete cycle of a backward scan will be described. At the beginning of the cycle of backward scan, it will be assumed that location register 8 contains the location (address or offset) of symmetric difference separator ΔCD, 3 which separates text C from text D of an encoded string. Length register 9 contains the length of text D, 4; whereas, symmetric difference register 5 contains the encoded symmetric difference separator ΔCD, 3. In scanning backwards, (i.e. right-to-left) it is desired to find the location of ΔBC, 1. In general, this will be done by generating the length of text C, 2, from the symmetric difference separator ΔCD, 3, and the length of test D, 4, in exclusive-OR complementor 6 and then subtracting the length of text C, 2, in binary adder 7, from the address in location register 8 of symmetric difference separator ΔCD, 3. Accordingly, therefore, the symmetric diference separator ΔCD, 3 is first loaded via path 12A into symmetric difference register 5 and then transferred via path 13C to exclusive-OR complementor 6. The contents of length register 9 are then transferred via path 14A into exclusive-OR complementor 6 where carry-free exclusive-OR addition is performed and the results transferred back to length register 9 via path 15B; moreover, the results are also transferred via path 15A to binary adder 7. (Note in backward scan binary adder actually performs binary subtraction). Simultaneously the contents of location register 8 are also transferred to binary adder 7 where in this case binary subtraction is performed to give the location (address or offset) of symmetric difference separator ΔBC, 1, and this result is transferred via path 17A back into location register 8. Finally, symmetric difference separator ΔBC, 1 is transferred over path 19A into symmetric difference register 5. The final result at this point in time of this cycle of backward scan is as follows: location register 8 now contains the address of symmetric difference separator ΔBC, 1 pointed to by dashed arrow 18A; length register 9 contains the length of text C, 2; and symmetric difference register 5 contains the contents of symmetric difference separator BC, 3. Since the backward scan cycle is the exact inverse of the forward scan cycle, any number of iterations of forward scan or backward scan can take place in any order at any time, and accordingly, complete freedom for bidirectional scanning is provided by the hardware mechanism just described.

The hardware shown on FIGS. 6A and 6B was utilized to show how forward and backward scanning is accomplished when one field at a time is addressed by the computer. However, it is also possible to accumulate a table of field descriptor words in a computer memory which will then represent the location and length of each encoded piece of text exactly in an array which can be indexed in a way known for digital computers. In order to provide information and load such a table of field descriptors utilizing the hardware of FIGS. 6A and 6B, a field descriptor word 10 is generated. This field descriptor word is comprised of the contents of location register 8 and length register 9 which are supplied along paths 19 and 20, respectively. Utilizing, therefore, a computer having a memory which is provided with an index register (well known in the art) which counts the number of field such as A, B, C, D, and for each such field loads a field descriptor word into a corresponding element of a table in the memory, then the result of scanning in the forward direction from the beginning of a text string to the end is to have accumulated a table of field descriptor words which then identify the exact location and length of each text string.

A Second Embodiment of the Invention

Figure 7:
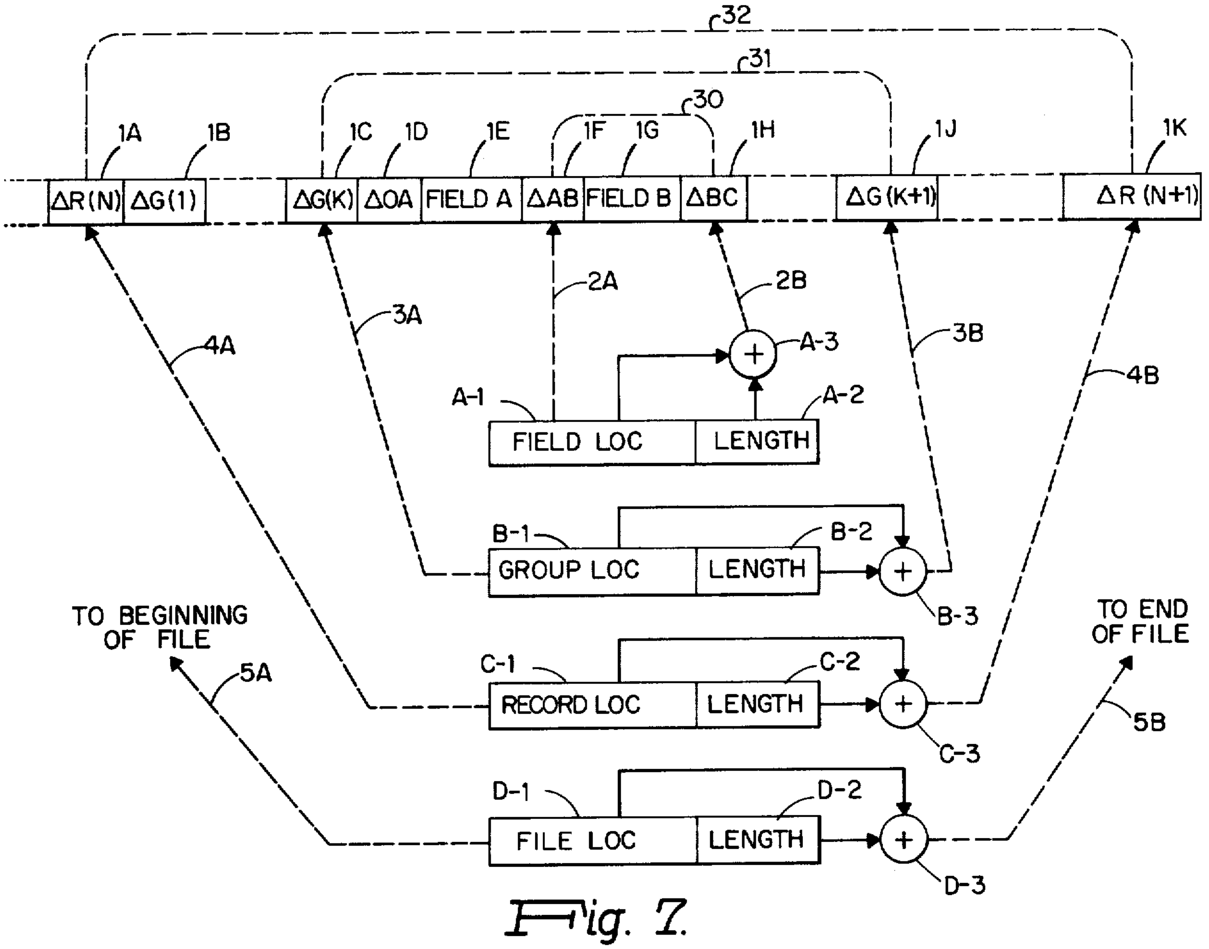
FIG. 7 is a logic block diagram of the invention for tree-type hierarchical data structures.

An extension of the hardware shown in FIGS. 6A and 6B supports a method of symmetric difference coding at multiple levels for hierarchical or tree structured data (this method of representation of tree structured data was discussed in Section 4 of the description of the invention in regard to FIGS. 4 and 5). FIG. 7 shows the additional hardware required to accumulate and store a sequence of descriptors for encoded strings of text at successively higher levels. In order to preserve clarity in describing the invention and various paths and the exclusive-OR complementor and symmetric difference register (shown on FIGS. 6A and 6B) are not shown. However, it is understood that the topmost register in FIG. 7, (A-1 and A-2) contains the field descriptor word, 10 of FIG. 6A. The hardware for each additional level of data is shown in FIG. 7 as a set of registers. In actual hardware these registers would together comprise a last-in, first-out or LIFO stack mechanism, which means that additional registers may be added only at the top of FIG. 7 or the topmost register on FIG. 7 may be taken away (in an actual embodiment, an index register would keep track of the current topmost register on FIG. 7; registers above this one actually exist in the memory of a computer but are simply ignored). Thus, the structure and data paths of FIGS. 6A and 6B are operative and applicable to the topmost register of FIG. 7 which corresponds to a single node or subtree of the encoded data structure of FIGS. 4, 5 and 7.

In FIGS. 6A and 6B the encoded string of text was regarded as a single sequence of individual text pieces separated by symmetric difference separators all of which occurred at the same level; therefore, the only identification possible for a single piece of text is its location with respect to the beginning of the text string and its length. With respect to FIG. 7 larger or smaller pieces of text may be described at different levels of grossness or detail. The encoded string of text on FIG. 7 is more complex. A sequence of fields A, B, etc., (1C through 1H) has been collected together into a group called G(K). This group is enclosed within two separators ΔG(K), 1C and ΔG(K + 1), 1J. Each field A, B, etc., within the group is separated by a symmetric difference separator such as ΔAB,1F,ΔBC,1H etc. Before the first field within this particular group, field A,1E, is a separator Δ0A,1D, which contains the length of field A, 1B(including one separator). (Note that there may be many fields within a group and also many groups within a record; each field is separated from another field by a symmetric difference separator and each group is separated from another group by a symmetric difference separator etc.).

This collection of field and groups is subdivided at another higher level called a record, and each record is enclosed within two symmetric difference separators ΔR(N),1A, and ΔR(N + 1), 1K. The next higher level of data is the file which also has symmetric difference separators (not shown) between files. Note that dash line 30 delineates one field between separators, dash line 31 delineates one group, and dash line 32 delineates one record.

Given that the particular heirarchical structure contains 4 levels, the additional hardware structure over the embodiment of FIGS. 6A and 6B, is a file location register D-1 and a file length register D-2; a record location register C-1, and a record length register C-2; a group location register B-1, and a group length register B-2; a field location register A-1, and a field length register A-2. In general the number of these registers is variable and they are stored in computer memory. In FIG. 7 a binary adder D-3, C-3, B-3 and A-3 respectively are shown provided to add the contents of the location and the length register in order to obtain the length of the opposite end of the data group being scanned. However, one binary adder can be utilized for all these registers because only the topmost register of the stack actually participates in the scanning operations of FIGS. 6A and 6B. The only difference when group, record, or file descriptions instead of field descriptions are located in the topmost stack registers in that internode separators must be extracted from fields (see FIG. 5) instead of from field separators. Similarly, an exclusive-OR circuit may be provided for each level of data or one exclusive OR circuit with appropriate gating may be provided for just the topmost level of data being scanned. (The techniques of LIFO stack maintenance, sequencing and gating data are well-known in the computer art and need not be further discussed in this disclosure). Note that dashed line 30 delineates one field between separators, dash line 31 delineates one group, and dash line 32 delineates one record.

Referring again to FIG. 7 the location and length of the file are stored in the file location register D-1, and the file length register D-2 respectively. The file location register D-1 contains the relative offset location of the beginning of the complete file or tree structured organization of data. This is indicated by dashed arrow 5A pointing to the beginning of the file which is not shown on FIG. 7. By adding the file length register D-2 contents to the contents of file location register D-1 in binary adder D-3 the end point of final position of the complete file is located as indicated by dashed arrow 5B. This end point may also mark the beginning of the next sequential file for determining its length. The file is envisioned not as a sequence of fields of small size but as a sequence of record each of which may be subdivided into groups which are then further subdivided into fields. Assuming, therefore, it is desired by the user, programmer, operating system etc. to find field B within group K of record N on the data structure represented in FIG. 7. In order to find record N, the beginning of the file as indicated by file location register D-1 is obtained, with registers D-1, D-2 at the topmost stack location. This beginning therefore forms the reference point with respect to the location of records contained in this file. Accordingly, a second register C-1, C-2 is pushed onto the stack and initialized to the first record separators ΔR(1), location and the record length ΔR(1) respectively. By a slight adaptation of the techniques described with respect to FIG. 6A, left-to-right scan is made of all symmetric difference separators for the records. This record scan is repeated N times (skipping over group and field symmetric difference separators) until the location of the required record R(N), 1A, is obtained. When the required record is reached record location register C-1 contains the address or offset of record N from the beginning of the file, and record length register C-2 contains the length of record number N. Having thus located record number N a search is begun within record N for a group number K. In order to do this while still retaining the capability of returning to the location of record N and from there jumping or scanning to other prior (N−1, N−2, etc.) or successor records (N + 1, N + 2, etc.), a new group descriptor word is constructed in group location register B-1 and group length location register B-2, on top of the stack. Initially when entering the subordinate level of data organization within record N, the group descriptor word in registers B-1 and B-2 will contain the location and length of the first group within record number N. The location of the first group (actually of its left-hand separator ΔG(1)) is shown as component 1B in FIG. 7. The forward scan of the group then continues for K cycles until the desired group number K within record number N is reached. At this point in time, the group location register B-1 contains the location of group separator ΔG(K), 1C. This is indicated by dashed arrow 3-A on FIG. 7. At the same time group length register B-2 contains the length of group K which is indicated by dashed line 31. The significance of dashed line 31 is that, starting at the left end of group K, group number (K + 1) may be located by adding the group relative offset contained in group location register B-1 to the group length contents of group length register B-2, in binary adder B-3. However, in this particular example it has been assumed that it is desired to enter group K and scan through the fields to locate a particular field B,1G. In order to do this another field descriptor word is provided by adding field registers A-1 and A-2 containing the location and length of the first field of group K, to the stack of descriptor registers. Once again by successively applying a number of forward scan cycles at the field level the field location and length registers A-1 and A-2 are updated until they point to the symmetric difference field separator ΔAB,1E, which is the address of field B,1F, that was desired by the user. At this point in time, therefore, field location register A-1 contains the address or offset from a reference point at which is contained field separator ΔAB,1E while field length register A-2 contains the length of field B,1G. In order to reverse this process, it is only necessary to pop, or remove from the stack, the contents of field registers A-1 and A-2 and ignore them in order to return to the group level of the tree structure at which point group levels may be scanned forwards or backwards. On the other hand, once having reached field B, it may be desired to continue scanning at the field level; then the field location and length registers A-1 and A-2 would not be cleared. Similarly, any level may be entered in the backward scan. Hence, it has been shown how a user, whether it be a programmer or the operating system, can access successive components at any level of the data structure without scanning each and every lower level structure. In the simplest case the user (e.g. operating system) knows precisely which numbered record within the file is to be accessed and furthermore it knows precisely which group within the record is to be extracted and which particular field within the group is to be extracted.

An alternate criteriator utilizing this hardware to locate and detect particular portions of a tree structured data organization requires additional known hardware such as comparators or an associative memory. In this alternate method a particular record or a particular group is to be selected on the basis of the content of a particular field or fields within the record or group. Scanning based on inspecting the contents of the specified field proceeds as before using the field descriptor register pair D-1, D-2, to locate the field against which a particular value is matched, wherein scanning may then descend to a next lower level and the process may be repeated. For example, a search over a set of records to locate a record with a particular field value proceeds by extracting the contents of a specified field of each record, and comparing said content to a desired key value if the values match the desired field within the record, the desired record has been located. Similarly, it can be seen that if a scan is successful in locating a given record, a search may then be initiated within the given record until a match is obtained to a designated group key field value, wherein another scan may be initiated then at the field level until a match is made at the field level with a predesignated field value.

Figure 8B:
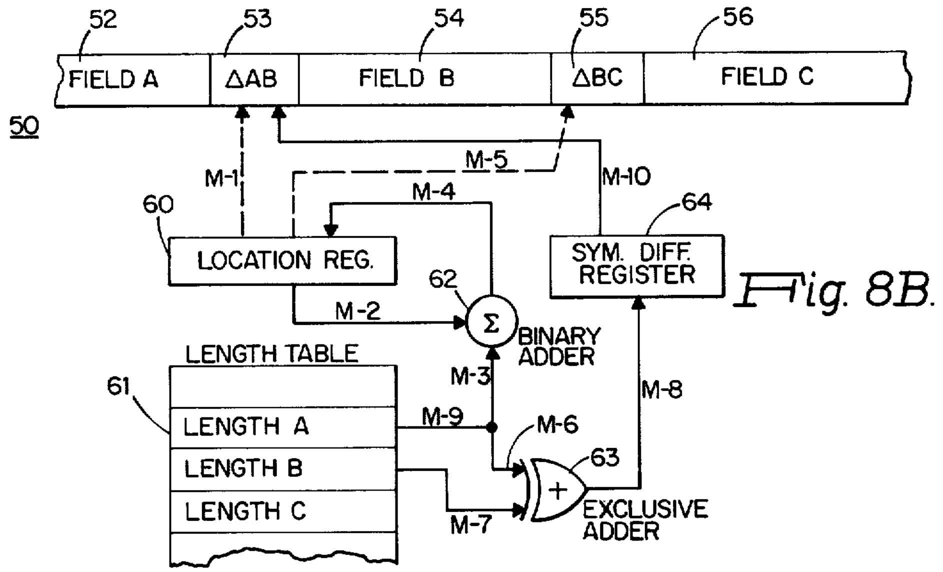
FIGS. 8A–8C are diagrams of the hardware for generating a symmetric difference code.
Figure 8C:
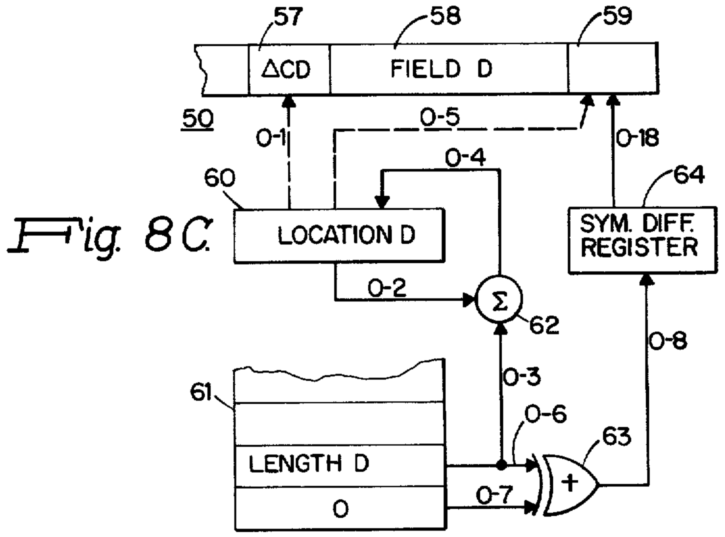
Figure 8A:
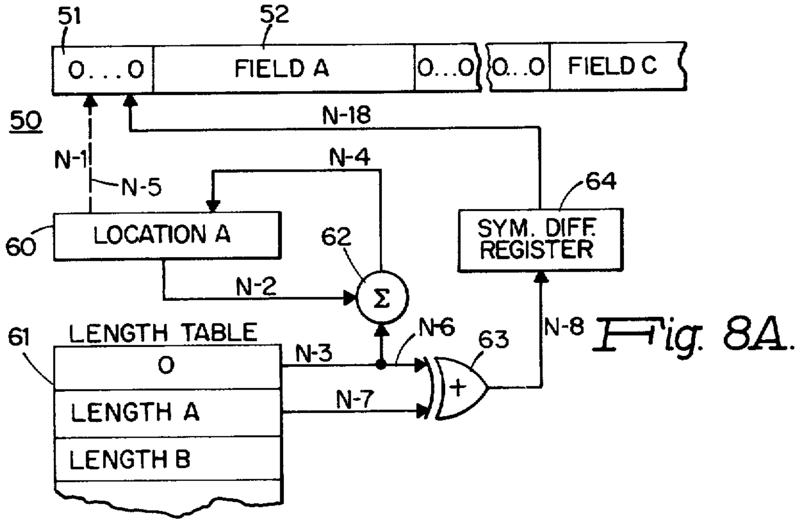

Referring now to FIGS. 8A-8C there is shown the hardware for generating a symmetric difference code and installing said code in a data string containing a sequence of data fields. The hardware is identical in all three FIGS. 8A-8C; however, FIG. 8A shows the state of the hardware on the final step of code generation. By utilizing conventional methods a data string 50 is first prepared having Fields A, B, C, etc., each field is separated by 8-bit separators which are initially filled with zero bits. As the data string is being thus prepared in memory, length table 61 is also generated which stores the length of each field in data string 50. At this point in time, a portion of computer main memory contains the data string desired with each field in the data string having an empty separator field and it further contains a length table showing the length of each field in the data string 50.

Referring now to FIG. 8A the initial symmetric code separator is generated by first placing the main memory location of the beginning of data string 50 into location register 60. The contents of location register 60 are then placed, via path N-2 into binary adder 62. At the same time the contents of the first word of the length table 61, which are zero, are transferred through path N-3 to binary adder 62. The result of binary addition is the absolute address of the beginning of data string 50 and is transferred through path N-4 to location register 60. At this point in time, Location Register 60 points to the beginning of Field A of data string 50. The symmetric difference code to be installed in location 51 of data string 50 is generated by reading out along paths N-6 and N-7 the contents of the first two locations of length table 61. These two values are exclusive-OR added together in exclusive-OR adder 63. The result of the addition is transferred along path N-8 to symmetric difference register 64. Symmetric difference register 64 at this instant in time contains the initial symmetric difference separator code which is to be installed in Field 51 of data string 50. Since the location in main memory of data string 50 has been stored in Location Register 60 the initial symmetric difference separator code located in symmetric difference register 64 is placed into the initial Field 51 of data string 50 along path N-18 utilizing location register 60 as a pointer N-1.

Referring now to FIG. 8B the remaining symmetric difference codes for data string 50 are sequentially generated to separate each data field of data string 50, with the exception of the last field of the data string. First the contents of location register 60 containing the initial address of data string 50 is placed via path M-2 into binary adder 62 and at the same time the length of Field A in length table 61 is placed via path M-9 into binary adder 62 and binary added together to give the location of Field 53 in the data string 50. This new location is then placed in Location Register 60 via path M-4 to replace the original initial address. At this instant in time, therefore, Location Register 60 contains the address of Field 53 which is to contain the symmetric difference code Δ AB when it is generated. The symmetric difference code Δ AB is generated by exclusive-OR adding the length A and length B in table 61. Length A on Length Table 61 is placed into exclusive-OR adder 63 via paths M-9 and M-6 while the length of Field B is also placed in exclusive-OR adder 63 from Length Table 61 via path M-7. The result of the exclusive-OR addition is placed via path M-8 into Symmetric Difference Register 64 which is then transferred via path M-10 to Field 53 which is pointed out by location register 60. Paths M-9 and M-7 are then advanced to extract LENGTH B and LENGTH C during the next cycle of operation. This process is repeated over and over again to generate all symmetric difference separators for Data String 50 except for the last symmetric code difference separator in the Data String 50.

A slightly different method of generating the code for the last symmetric difference separator is utilized in order to permit backward scan as well as forward scan. Referring now to FIG. 8C the code of the last symmetric difference separator in the Data String 50 is generated by exclusive-OR adding the length of Field D in Table 61 to zero also located on table 61. The length of Field D in table 61 is placed into exclusive-OR adder 63 via path 0–6, and the zero from length table 61 is placed into exclusive-OR adder 63 via path 0–7. They are then exclusive-OR added and transferred to Symmetric Difference register 64 via path 0–8 and finally transferred to the last position 59 of the Data String 50 via path 0–18. Note that at this point in time, after having sequentially generated all the prior symmetric difference separators, location register 60 contains the address D of Field 59, which is the rightmost location of string 50.

Figure 9:
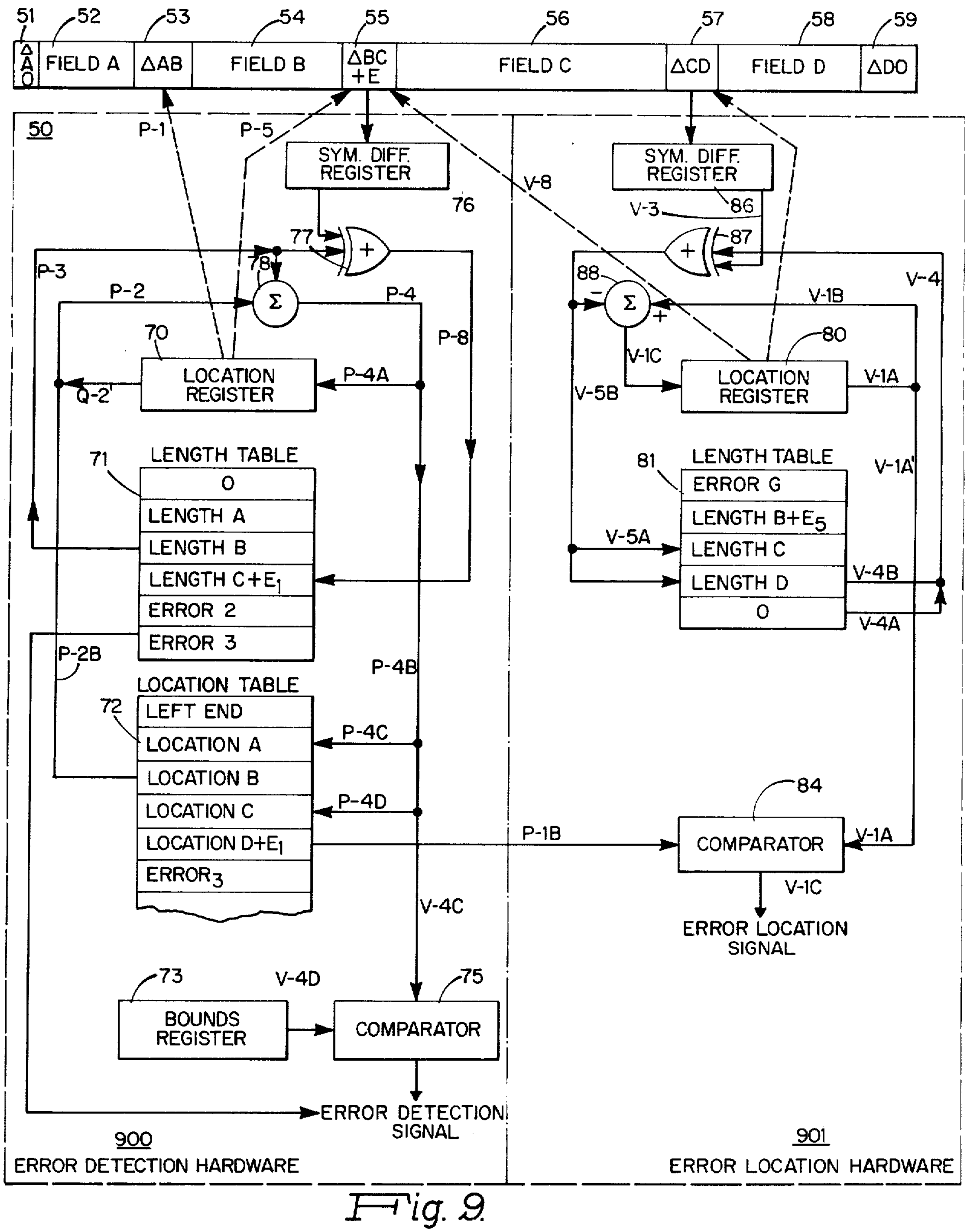
FIG. 9 is a diagram of the hardware for detecting and correcting errors in a symmetric difference separator in any position.

Referring now to FIG. 9 there is shown hardware for detecting and correcting errors in the contents of symmetric difference separator positions of a data string. As discussed in Section 3 supra of this application, one technique detects positional errors of the symmetric difference separators during a forward or reverse scan of data string 50, whereas another technique locates those errors after they have been detected. The hardware of FIG. 9 comprises basically 2 major sections, the ERROR DETECTION HARDWARE 900 which is utilized to detect errors in symmetric difference separators, and the ERROR LOCATION HARDWARE 901 which is utilized to locate these errors once they have been detected. As discussed in Section 3 supra of this application, the parity check sum of all the symmetric difference separators within a given block must add to zero. This is true because symmetric difference separators as has been previously shown are generated by exclusive-OR addition of adjacent fields. Accordingly, when the symmetric difference separators are exclusive-OR added they will produce the field length which generated them. Since each field was used twice in producing the symmetric difference separators of a data string, field type or length code will appear in pairs when the symmetric difference separators are exclusive-OR added thus causing pair wise cancellation in the overall check sum. Accordingly, exclusive-OR addition of the symmetric difference separators in a given block will result in a check sum of zero if all symmetric difference separators are current. Moreover, whenever there is an error in a particular symmetric difference separator its absolute address may be constructed in the forward or left to right scan by adding all previous field lengths to the initial address of the block until that particular symmetric difference separator is reached. Similarly, a true address of the symmetric difference separator in error can be constructed from a reverse scan or a right to left scan by subtracting from the absolute end address of the block each field length between the end of the block and the symmetric difference separator in error. All these principles are utilized to first detect errors and secondly locate them. In the first instance of error detection, a left to right scan is used although a right to left scan could also be used. For example, in FIG. 9 assume for the moment that there was no error in field separator 55. Then all the field lengths of Data String 50 must have been correct. If a location table 72 is constructed using these field lengths, it will contain the correct address of each symmetric difference separator including the last one which indicates the end of the block. To determine that the address of the end of the block which has been generated using all the various field lengths is correct, it is merely necessary to compare the known address of the end of the block with the generated address. If they are equal, then either all field lengths and all field locations are correct, or at least two symmetric differences are in error. A bounds register 73 is utilized to store the known correct address of the end of the block and is compared to the generated address of the end of the block in comparator 75. Now assume the condition where there is an error in symmetric difference separator 55 indicated by Δ BC + E. In a left to right scan all prior computed field lengths are correct. However, all the field lengths computed after this error location will be incorrect. (See length table 71). Hence a location table such as 72 constructed for Data String 50 with this error included would have an incorrect generated address for the end of the block which would therefore not be equal to the known address located in bounds register 73. Accordingly, therefore, to detect an error in any symmetric field separator, a length table and a location table with entries for each field is generated by Error Detection Hardware 900. (This process will be more fully discussed infra). As each location of each field is generated and placed in location table 72, it is compared in comparator 75 to the known right end location in bounds register 73. (Note that the paths shown in the error detection hardware are for one instant of time and at a later instant these paths will be different). As long as the contents of bounds register 73 are greater than any location of any field within block 50, no error is indicated. However, since it has been assumed in this example that there is an error in Symmetric Difference Separator 55, all the field lengths following this position will be in error and accordingly either a generated location of a field in table 72 will become greater than the contents of bounds register 73 (indicating that the generated end location of the block is greater than the actual end location of the block) or else the location of the last field in the block will have been generated, placed in location table 72 and compared in comparator 75 to the contents of bounds register 73 and found to have been less than the actual location. Both of these conditions will result in an error. Therefore at any time that the contents of the bounds register becomes less than any generated location of any field within a given block, an error detection signal is generated. Also after the last location of the last field in the block has been generated, compared to the contents of the bounds register 73 and found to be less than the contents of the bounds register, an error detection signal is again generated.

Generally, the end of the block is known because the number of fields are known or because predetermined size blocks are used or because the tree structure indicates the length of the block.

Referring once again to the error detection hardware of FIG. 9 and assuming that symmetric difference separator Δ BC in field 55 is in error, the length table 71 and the location table 72 for Data String 50 is constructed utilizing a left to right scan. Simultaneously with the construction of these tables, a comparison is made of the generated location of each field with the location of the right end of string 50. It was previously shown supra how to generate any symmetric difference separator from the fields on either side of it and construct a length table. (See FIGS. 8A-8C, and the description thereof in the text). The following will describe the construction of the location table as each symmetric difference separator is generated and a comparison of that location with a known location of the end of block of information.

A block of information comprising a Data String 50 (having Fields A-D in this example) with one byte separators included between each field is placed in a known location in main memory. Since the location is known the address of the block is loaded in location register 70, and also since the length of the block is also known, in this instance it being assumed a predetermined known length, the right end location of the block of information of Data String 50 is also known and is placed in bounds register 73. Field A or 52 begins at the left end of the block and accordingly there is no data field within block 50 preceding Field A, and the prior field length therefore is zero. This value is placed in the first position of the Length Table 71 as shown on the Error Detection Hardware 900 of FIG. 9. To obtain the absolute location of the left end, or beginning of block 50, the length zero is binarily added in binary adder 78 to the contents of location register 70 thus generating the absolute location in main memory of the block of information 50. This location is placed in location table 72 in the space called left end. (Note in the drawing of FIG. 9 that each path of each successive step is not included and only selected typical paths are shown on the drawing, these paths being similar to the steps prior and following those illustrated on the drawing. To do otherwise, would unnecessarily confuse the drawing and the description). The length of Field A or 52 is equal to Δ AO, and is extracted from separator field 51 and placed in the Length A space of Length Table 71. Length A is brought into binary adder 78 and added to the contents of Location Register 70 which contents are also brought to binary adder 78 via path P-2. The result of this addition is brought out of binary adder 78 and placed in location register 70 via path P-4 and P-4A and also placed in location A of Location Table 72 via paths P-4, P-4B and P-4C and finally it is also placed in comparator 75, via paths P-4, P-4B and V-4C, and compared to the contents of Bounds Register 73 which contents are also placed in comparator 75 via path V-4D. If the contents of Bounds Register 73 is greater than the computed Length A, the process continues. In the next step a symmetric difference separator Δ AB, 53 is generated by exclusive-OR adding Field A and Field B in exclusive-OR adder 77 as previously discussed in conjunction with FIGS. 8A-8C. This process is repeated for each field separator. Since field separator 55 was assumed to be erroneously generated, all symmetric difference separators, and field locations generated thereafter will also be erroneous. However, at this point in time, the hardware is not aware of it. It continues generating the length of C which is in error and places it in Length Table 71 and then continues to generate the Location D which is also in error and places it in Location Table 72. Also the hardware after each generation continues to make comparison checks in comparator 75 between the generated location and the known end location. At some point before the end of the block is reached, a comparison in comparator 75 of the generated location with the end of the block location contained in bounds register 73 will show that the limits of the bounds register will have been exceeded; or else equality of the bounds register 73 and location register 70 content will show that the right end of the block of information 50 has in fact been reached but the generated absolute location in the last entry of Length Table 71 (Error 3) is nonzero. (A correct block would have resulted in the zero entry shown in Table 81). This indicates that an error has occurred somewhere within block 50 but its location is not known. To determine the exact location of the error, the Error Location Hardware 901 of FIG. 9 is required.

The basic principle for locating the absolute address where there is an error in a symmetric difference separator, is based on the fact that all generated locations of each field prior to encountering the erroneous block are correct irrespective of the direction from which the absolute address location is generated; whereas all address locations after the error has occured are incorrect irrespective of the direction, left to right or right to left, in which the addresses were generated. By generating absolute addresses twice for each field, utilizing results from a forward scan and a reverse scan respectively, and then comparing the two absolute addresses for each field point is detected when the address is correct irrespective of the direction from which it was generated, but prior to this point the addresses do not match. For example, in FIG. 9 an assumption has been made that the symmetric difference separator Δ BC + E, 55 is in error. Hence in the forward scan (i.e. left to right) all address locations generated up to Field 55 are correct; whereas all address locations generated after Field 55 are incorrect. Moreover, in a backward scan the reverse is true, all addresses beginning from Field 59 and traversing right to left to Field 55 are correct whereas all addresses after Field 55 including Fields 54, 53, 52 etc., are incorrect. Hence to find the exact location where an error occurred, it is merely necessary to generate in addition to a location table in a forward scan another location table in a reverse scan beginning at the end of the block (e.g. space 59) and generate the absolute location of each field within the block 50 by subtracting field lengths from the end of block 50. Then by comparing the two generated field location tables that were generated by forward and reverse scan respectively an absolute location within the block will be reached in this instance Field 55 where the absolute location generated in the forward scan (location C in Table 72) is equal exactly to the absolute location generated in the reverse scan (not shown on FIG. 9). (This is true because a correct address for the absolute location of Field 55 in the forward scan direction is available and also a correct address for Field 55 in the reverse scan direction is available and these addresses are exactly the same in the forward and reverse direction).

The above principle is implemented utilizing the Error Location Hardware 901 of FIG. 9 as follows. The location of the end of the data stream of block 50 is placed in location register 80. Since Δ DO, Field 59 is the end of Block 50, any field beyond the block relative to the block has a length of zero. This length is placed in the last entry of Length Table 81 of the error location hardware. To generate the length of Field D, 58 in the reverse scan, the symmetric difference separator Δ DO is exclusive-OR added in exclusive-OR adder 87 to Field D, 58. The symmetric difference separator Δ DO, 59 is placed into symmetric difference register 86 and then placed in exclusive-OR adder 87 via path V-3. The length of the right hand field of symmetric difference separator Δ DO, 59 is zero and is located from the previous step in Length Table 81. This length is also placed in exclusive -OR adder 87 via path V-4A and V-4, where the two are exclusive-OR added giving the length of Field D, 58 which is then placed via path V-5B and V-4B in the Length Table 81. Next, the field separator Δ CD from Field 57 is placed in symmetric difference register 86 via path V-2 which is then placed in exclusive-OR adder 87 via path V-3. At the same time, the length D just generated and located in Length Table 81 is placed in exclusive-OR adder 87 via path V-4, and the two quantities exclusive-OR added to give the length of Field C, 56 which is then placed in Length Table 81 via path V-5B and V-5A. This process is repeated until all the lengths in the Data String 50 of the block of information are generated. Since this was generated via a backward scan, the lengths of Field D and Field C will be correct up to and including Field 55. However, Field Length B, 54 and Field Length A, 52 will not be correct in this backward scan. On the other hand, table 71 whose lengths were generated by a forward scan will have Field Length A, 52 and Field Length B, 54 correct; whereas after the incorrect Field 55, Field C, 56 and Field D, 58 will be incorrect. It was noted previously that to locate the error a comparison of locations generated in the forward scan with locations generated in the reverse scan was to proceed until an equality resulted. Accordingly, therefore, as each length of each field is generated in the backward scan, the absolute location of that field is also generated in the location register 80 as follows. For example, having generated Length D of Field D, 58 the absolute location of Field D is generated in the reverse scan by subtracting the length of Field D in binary adder/subtractor 88 from the absolute end location 59 of block 50. This is performed by placing the address of the end of the block 59 in binary adder/subtractor 88 via paths V-1A and V-1B. At the same time, the length of Field D is placed into binary adder/subtractor 88 from Length Table 81 via paths V-4B and V-4. The results of this subtraction are then placed in location register 80 via path V-1C. Accordingly, location register 80 now contains the absolute location of Field 57 which was generated by a reverse scan. The location of Field D containing an error E1 which is located in location table 72 was generated by a forward scan. This location is then compared in comparator 84 to the location of Field D as generated in the reverse scan. The location of Field D (including the error E1) is placed in comparator 84 via path P-1B; also the contents of location register 80 are placed in comparator 84 via paths V-1A and V-1A' and compared. In this instance, since location D in forward scan is the wrong location, whereas location D in the reverse scan is the right location, no match will result. As this procedure is repeated, it will eventually extract the location of Field 55, which contains the actual error from Table 72 as produced correctly in the forward scan (Location B in Location Table 72). The location of Field 55 is also computed correctly during the reverse scan and will at this instant of time be located in Location Register 80. A comparison of the contents of Location Register 80 with Location C of Location Table 72 in comparator 84 will then be equal, thus locating the error.

Note that Length Table 71 is not required for error location, because all its relevant information has been extracted into Location Table 72. Therefore Length Table 81 is not necessary since in fact Length Table 71 may be reused for the backward scan during the error location process. It will be apparent from the foregoing disclosure of the invention that numerous modifications, changes and equivalents will now occur to those skilled in the art, all of which fall within the true scope contemplated by the invention.

GLOSSARY (From Fundamental Algorithms — Vol. 1 — The Art of Computer Programming, Donald E. Knuth, Addison-Wesley Publishing Company).

| | |
|---|---|
| Atomic element | An element from a universe of objects that might be desired. |
| Tree | A finite set T of one or more nodes such that: (a) there is one specially designated node called the root of the tree (T); and, (b) the remaining nodes (excluding the root) are partitioned into m ≧ 0 disjoint sets $T_1$ ...., $T_m$, and each of these sets in turn is a tree. |
| Subtrees | The trees $T_1$ .... $T_m$ are called the subtrees of the root. |
| Root | A specially designated node of a tree. |
| Node | One or more consecutive words of a computer memory, divided into named parts called fields. (Synonyms for nodes are records, entities, beads). |
| Degree of Node | The number of subtrees of a node. |
| Terminal Node or Leaf | A node of degree zero. |
| Branch Node | A non-terminal node. |
| Level of a Node | The level of a node with respect to T wherein the root has level 1, and other nodes have a level that is one higher than they have with respect to the subtree of the root $T_j$, which contains them. |
| Forest | A set of zero or more disjoint trees. Also, the nodes of a tree excluding the root. |
| Linear List | A set of m ≧ 0 nodes whose structural properties involve only the one dimensional relative position of nodes. |
| Stack | A linear list for which all insertions and deletions are made at one end of the list. |
| Queue | A linear list for which all insertions are made at one end of the list; all deletions (and usually all accesses) are made at the other. |

GLOSSARY-continued (From Fundamental Algorithms — Vol. 1 — The Art of Computer Programming, Donald E. Knuth, Addison-Wesley Publishing Company).

| | |
|---|---|
| Dequeue (double-ended queue) | A linear list for which all insertions and deletions are made at the ends of the list. |

What is claimed is:

1. An apparatus for generating symmetric difference separators for separating sequential data fields of variable length, said apparatus comprising;

a. first means for storing the length of at least two adjacent data fields to be separated by one of said symmetric difference separators; and, b. second means coupled to said first means for generating said one of said symmetric difference separators.

2. The apparatus as recited in claim 1 wherein said second means is a carry-free exclusive-OR adder and said one of said sequential difference separators is generated by exclusive-OR adding the length of said adjacent fields to be separated.

3. The apparatus as recited in claim 2 including third means coupled to said first and second means for generating an absolute address of any of said sequential fields.

4. The apparatus as recited in claim 3 including fourth means coupled to said third means for storing the current absolute address of the most recent of said any of said sequential difference separators generated.

5. The apparatus as recited in claim 4 wherein said third means is a binary adder for algebraically adding the length of one of said adjacent fields to said most recently generated absolute address.

6. A bidirectional scanning apparatus for determining in a forward or reverse direction, the address of a next sequential field desired in a sequence of fields of variable length, said bidirectional scanning apparatus comprising:

a. first means for storing the length of at least two adjacent data fields, to be separated by a symmetric difference separator;

b. second means coupled to said first means for generating said symmetric difference separator;

c. third means, coupled to said first and second means, and responsive to said sequential difference separator and the length of one of said adjacent fields for generating the length of the other of said adjacent fields; and, d. fourth means, coupled to said third means, for algebraically adding the length of either of said adjacent fields to the location of said symmetric difference separator.

7. The bidirectional scanning apparatus as recited in claim 6 wherein said second means is comprised of a carry-free exclusive-OR adder/subtractor.

8. The bidirectional scanning apparatus as recited in claim 7 wherein said third means is a carry-free exclusive-OR adder/subtractor.

9. The bidirectional scanning apparatus as recited in claim 8 wherein said fourth means is comprised of a binary adder for performing signed algebraic addition.

10. The bidirectional scanning apparatus as recited in claim 9 including fifth means coupled to said fourth means for storing said locations of said symmetric difference separators.

11. In combination with a bidirectional scanning apparatus for determining, in a forward or reverse direction, the address of a next sequential field desired in a sequence of fields of variable length within a block of information, said fields in said sequence being separated from each other by symmetric difference separators, each symmetric difference separator comprised of the carry-free exclusive-OR addition of the values of the lengths of its adjacent fields on either side of said symmetric difference separator, an apparatus for detecting errors in said symmetric difference separators comprising:

a. first means for storing the absolute address of the end of said block of information;
b. second means for generating the absolute location of each of said sequential fields; and,
c. third means, coupled to said first and second means, for comparing the absolute address of the end of said block with each of said absolute locations of said sequential fields.

12. The apparatus as recited in claim 11 including fourth means, responsive to said third means, for locating errors in said symmetric difference separators when said absolute address of the end of said block is greater or less than the absolute address of the absolute location of said sequential field then being compared.

13. In combination with a bidirectional scanning apparatus for determining, in a forward or reverse direction, the address of a next sequential field desired in a sequence of field of variable length within a block of information, said fields in said sequence being separated from each other by symmetric difference separators, each symmetric difference separator comprised of the carry-free exclusive-OR addition of the values of the lengths of its adjacent fields on either side of said symmetric difference separator, an apparatus for locating errors in said symmetric difference separators comprising:

a. first means for generating, by a left-to-right (i.e. forward) scan, the absolute address of each of said symmetric difference separators within said block;
b. second means for generating, by a right-to-left (i.e. backward) scan, the absolute address of each of said symmetric difference separators within said block; and
c. third means, coupled to said first and second means, for comparing the absolute address of any of said symmetric difference separators generated by a forward scan to the absolute address of said any of said symmetric difference separators generated by a backward scan.

* * * * *